(12) United States Patent
Hirata

(10) Patent No.: US 10,564,458 B2
(45) Date of Patent: Feb. 18, 2020

(54) CONNECTING MEMBER AND DISPLAY INCLUDING CONNECTING MEMBER

(71) Applicant: Mitsubishi Electric Corporation, Tokyo (JP)

(72) Inventor: Tetsuya Hirata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/251,754

(22) Filed: Jan. 18, 2019

(65) Prior Publication Data

US 2019/0243181 A1 Aug. 8, 2019

(30) Foreign Application Priority Data

Feb. 7, 2018 (JP) ................................. 2018-019957

(51) Int. Cl.
  *G02F 1/1333* (2006.01)
(52) U.S. Cl.
  CPC .... *G02F 1/133308* (2013.01); *G02F 1/13338* (2013.01); *G02F 2001/133311* (2013.01); *G02F 2001/133317* (2013.01); *G02F 2202/28* (2013.01)
(58) Field of Classification Search
  CPC ........... G02F 1/133308; G02F 1/13338; G02F 2001/133317; G02F 2001/133328
  See application file for complete search history.

(56) References Cited

U.S. PATENT DOCUMENTS

| 2017/0139259 A1* | 5/2017 | Kim | .................. G02F 1/133308 |
| 2017/0192290 A1* | 7/2017 | Won | .................. G02F 1/133308 |

FOREIGN PATENT DOCUMENTS

| JP | 2009-139640 A | 6/2009 |
| JP | 2015-222379 A | 12/2015 |

\* cited by examiner

*Primary Examiner* — Nathanael R Briggs
(74) *Attorney, Agent, or Firm* — Studebaker & Brackett PC

(57) ABSTRACT

Provided is a technique for preventing foreign-matter entrance from a connecting member disposed between at least two members. A connecting member includes the following: a body that is a flexible strip; a slit dividing the body into a first side and a second side facing each other; a pair of cuts disposed at both end portions in the longer-side direction of the body, each cut being a triangle; and notches disposed in respective positions contiguous to the slit on the first and second sides, each notch being a triangle. The slit is transformed into an opening by deforming the first and second sides and also changing the positions of the first and second sides in such a manner that two sides of the triangle of each cut abut, and that two sides of the triangle of each notch abut. The body continuously extends in its entire periphery.

7 Claims, 7 Drawing Sheets

F I G. 1
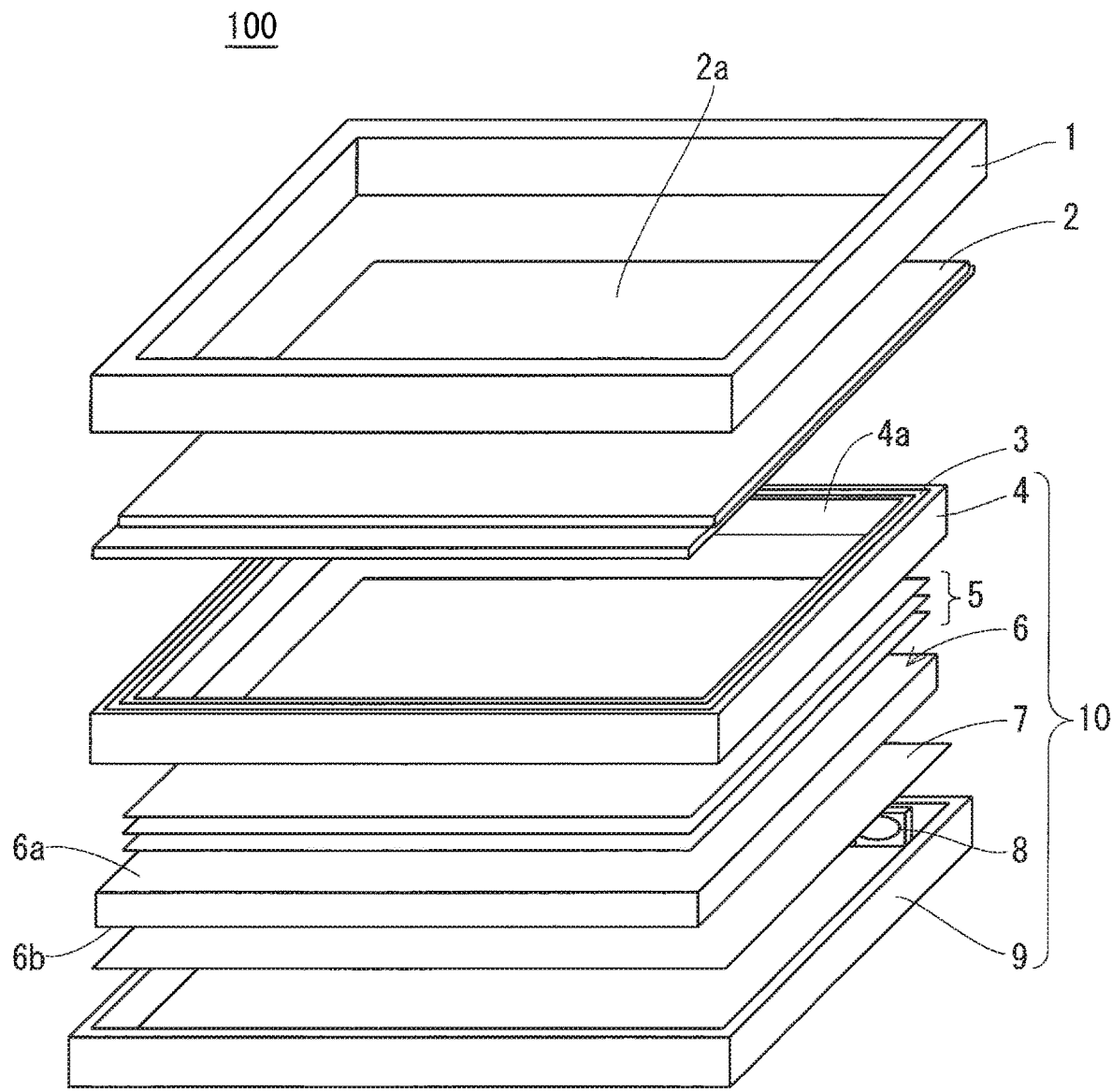

CONNECTING MEMBER AND DISPLAY INCLUDING CONNECTING MEMBER

BACKGROUND OF THE INVENTION

Field of the Invention

The present invention relates to a connecting member disposed between at least two members, and to a display including the connecting member.

Description of the Background Art

In conventional displays that include liquid-crystal display panels, light guide plates are disposed on surfaces opposite the display surfaces of the display panels so that light is guided to the display panel. Light sources, such as light-emitting diodes (LEDs), are disposed on the side surfaces of the light guide plates. Light is taken out to the display surfaces by propagating light beams from the light sources through the light guide plates, and diffusing the light beams using diffusion patterns disposed in the light guide plates.

A middle frame having an opening is disposed on the surface opposite the display surface of such a display panel. A rear frame supporting the horizontal movement of the light guide plate is disposed on a surface of the light guide plate opposite to a surface on which the display panel is disposed. Further, disposed on the display surface of the display panel is a front frame supporting the display panel and the middle frame, and having an opening.

At this stage, the display panel and the middle frame are fastened together with a connecting member, such as double-faced tape. Japanese Patent Application Laid-Open No. 2015-222379 and Japanese Patent Application Laid-Open No. 2009-139640, for instance, disclose a technique of connecting member formation through bending.

Japanese Patent Application Laid-Open No. 2015-222379 describes a display that uses cushioning tape as a connecting member. This cushioning tape is 90° bent at each slit to form a rectangle with four corners. Both end portions of the cushioning tape face each other on one side of the rectangle surrounding a display region.

Japanese Patent Application Laid-Open No. 2009-139640 describes a display that uses one spacer that is a rope having an L-shape in cross section. The display includes a housing having a container for liquid-crystal-display elements. The spacer is contained in the container after being drawn substantially around the side wall of the housing along the inner periphery of the side wall.

Japanese Patent Application Laid-Open No. 2015-222379 and Japanese Patent Application Laid-Open No. 2009-139640 both disclose that the display panel and the backlight are fastened together with one connecting member disposed between the display panel and the backlight. However, Japanese Patent Application Laid-Open No. 2015-222379 fails to disclose that both end portions of the cushioning tape are connected to each other; in addition, Japanese Patent Application Laid-Open No. 2009-139640 fails to disclose that both end portions of the spacer are connected to each other. That is, the cushioning tape and the spacer have disconnected portions. Unfortunately, foreign matters enter from the openings of the cushioning tape and the spacer through these disconnected portions.

SUMMARY

It is an object of the present invention to provide a technique for preventing foreign-matter entrance from a connecting member disposed between at least two members.

A connecting member according to one aspect of the present invention is disposed between at least two members. The connecting member includes a body that is a flexible strip, a slit, a pair of cuts each being a triangle, and notches each being a triangle. The slit extends in the longer-side direction of the body in the middle portion in the shorter-side direction of the body, with both end portions in the longer-side of the body being left. The slit divides the body into a first side and a second side facing each other. The pair of cuts, each of which is a triangle, are disposed at both end portions in the longer-side direction of the body. The notches, each of which is a triangle, are disposed in respective positions contiguous to the slit on the first and second sides. The slit is transformed into an opening by deforming the first and second sides and also changing the positions of the first and second sides in such a manner that two sides of the triangle of each cut abut, and that two sides of the triangle of each notch abut. The body continuously extends in its entire periphery.

The slit is transformed into the opening by deforming the first and second sides and also changing the positions of the first and second sides in such a manner that the two sides of the triangle of each cut abut, and that the two sides of the triangle of each notch abut. In addition, the body continuously extends in its entire periphery. The body consequently has no disconnected portion. Such a configuration prevents foreign-matter entrance from the connecting member.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an exploded perspective view of a display according to a first preferred embodiment;

DESCRIPTION OF THE PREFERRED EMBODIMENTS

First Preferred Embodiment

Figure 2:
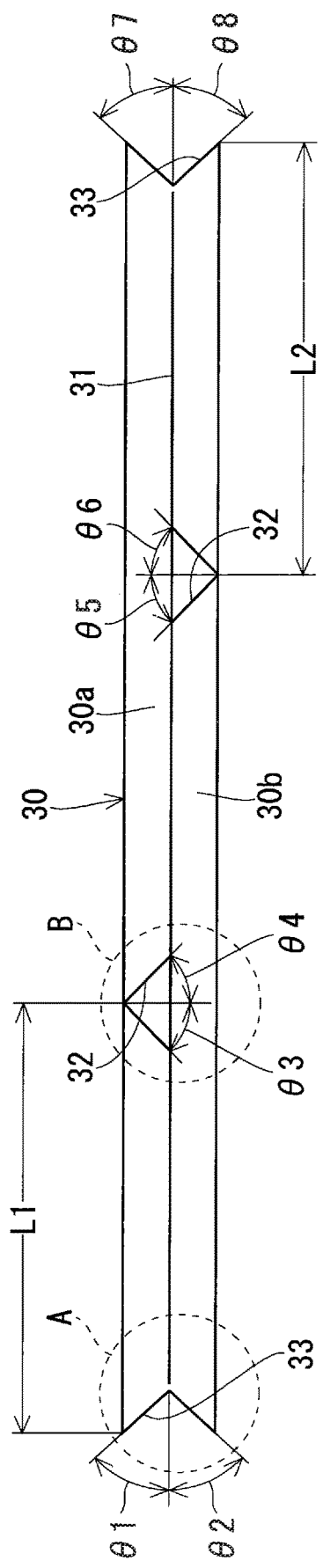
FIG. 2 is a plan view of a connecting member whose body is not deformed.

A first preferred embodiment of the present invention will be described with reference to the drawings. FIG. 1 is an exploded perspective view of a display 100 according to the first preferred embodiment.

As illustrated in FIG. 1, the display 100 includes a front frame 1, a display panel 2, a connecting member 3, a middle frame 4, and a backlight 10.

The display panel 2 is a liquid crystal panel, for instance, and displays an image. The front frame 1 is disposed on the front surface of the display panel 2. The backlight 10 is disposed on the back surface of the display panel 2.

The backlight 10 includes the connecting member 3, the middle frame 4, an optical-sheet set 5, a light guide plate 6, a reflection sheet 7, a light source 8, and a rear frame 9.

The connecting member 3 is double-faced tape. The connecting member 3 is disposed between the display panel 2 and the middle frame 4, and fastens both. The details of the connecting member 3 will follow later.

The light source 8 is a light-emitting diode (hereinafter, referred to as an LED) mounted on, for instance, a substrate. The light source 8 is disposed on a side surface of the light guide plate 6 so that light emitted from the light source 8 is guided to a display surface 2a of the display panel 2 for diffusion.

The light guide plate 6 is a plate made of resin, such as polyethylene terephthalate (PET), acrylic (i.e., polymethyl methacrylate or PMMA for short), polycarbonate (PC), or cycloolefin-based resin. Alternatively, the light guide plate 6 is a member having a light transmitting function, such as a glass substrate. The light guide plate 6, when particularly made of polycarbonate or cycloolefin-based resin, less involves size change resulting from temperature change. The light guide plate 6 is thus usable in a wider temperature range, which is preferable.

The light guide plate 6 has a light-outgoing surface 6a and a counter light-outgoing surface 6b. Disposed on the counter light-outgoing surface 6b is a light scattering unit (not shown) that disturbs a light propagation direction to guide light to the light-outgoing surface 6a. The light scattering unit serves as a means for taking out a light beam from the light guide plate 6 by disturbing a total-reflection condition of light propagating through the light guide plate 6. More specifically, examples of how to form the light scattering unit include printing a dot pattern on the counter light-outgoing surface 6b of the light guide plate 6, processing the counter light-outgoing surface 6b into a rough surface, and forming, on the counter light-outgoing surface 6b, asperities that change the light propagation direction, such as a minute sphere or prism. Here, the counter light-outgoing surface 6b is the lower surface of the light guide plate 6 on the drawing sheet. Further, the light-outgoing surface 6a is the upper surface of the light guide plate 6 on the drawing sheet.

The reflection sheet 7 is disposed on the counter light-outgoing surface 6b of the light guide plate 6 so as to effectively reflect light. The light guide plate 6 and the reflection sheet 7 are disposed inside the rear frame 9 made of, for instance, metal or resin. The reflection sheet 7 is made of metal, such as silver, aluminum, or stainless metal. Alternatively, the reflection sheet 7 is formed of an expandable PET film (white PET film) containing a fluorescent agent. A white PET film, which makes flaws on a reflection surface less visible and is easy to handle, is particularly preferable.

Disposed on the light-outgoing surface 6a of the light guide plate 6 is the optical-sheet set 5 consisting of a plurality of optical sheets for effective light use.

The optical-sheet set 5 includes a lens sheet, and diffusion sheets sandwiching the lens sheet. For brightness improvement, a plurality of lens sheets may be combined in view of the directions of prisms on their surfaces. Further, for diffusion improvement, two or more diffusion sheets can be used. Still further, a single lens sheet or no lens sheet may be used depending on the light distribution properties of a lens sheet. Yet further, a combination of a lens sheet and a polarization reflection sheet may be used. Still yet further, both no lens sheet and no polarization reflection sheet may be used; optimization is preferable in view of necessary brightness, necessary light distribution properties, and other things.

The light source 8, the light guide plate 6, the reflection sheet 7, and the optical-sheet set 5 are disposed on the front surface side of the rear frame 9, and held by the rear frame 9 and the middle frame 4.

The middle frame 4 is made of, for instance, metal or resin, and is a rectangular frame having an opening 4a. The display panel 2 is held by the backlight 10 and the front frame 1 that is a rectangular frame having an opening 1a. Furthermore, the display panel 2 is fastened to the middle frame 4 of the backlight 10 through the connecting member 3.

Although FIG. 1 illustrates that the light source 8 is disposed on only one side surface of the light guide plate 6, the light sources 8 and light source substrates may be disposed on two or more side surfaces of the light guide plate 6. Further, the light source 8 may be any element other than an LED; for instance, the light source 8 may be a cold-cathode fluorescent lamp (CCFL) or a laser diode. Still further, the light source 8 may be disposed just behind the light guide plate 6.

Figure 3:
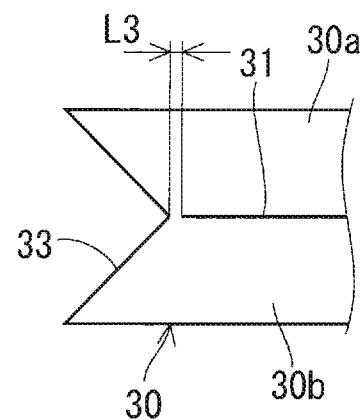
FIG. 3 is an enlarged view of region A in FIG. 2.
Figure 4:
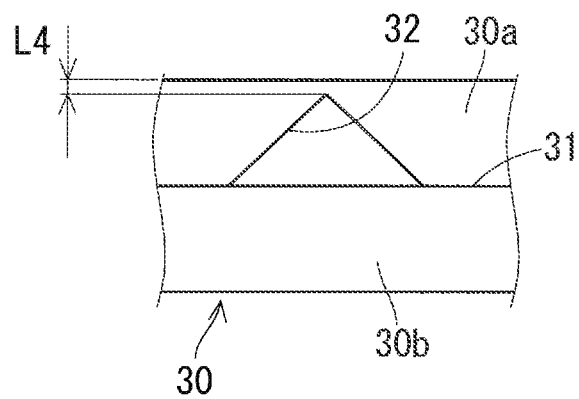
FIG. 4 is an enlarged view of region B in FIG. 2.
Figure 5:
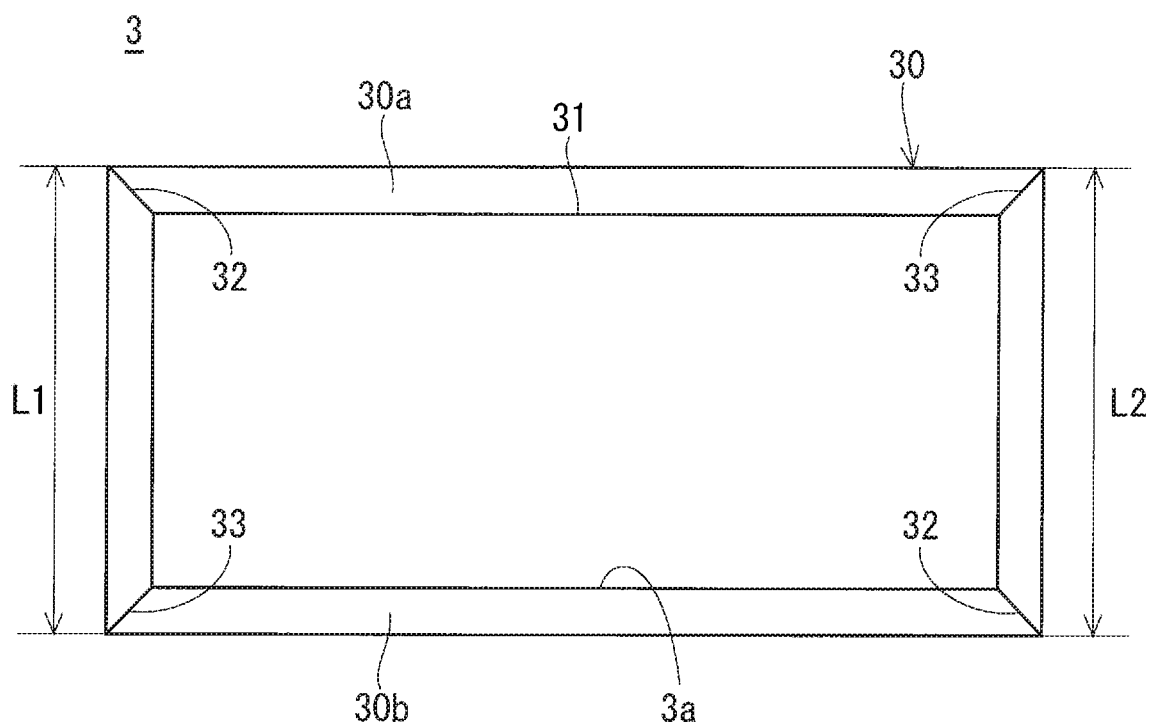
FIG. 5 is a plan view of the connecting member whose body is deformed.

The following describes characteristic configuration of the display 100 according to the first preferred embodiment, and its function and effect. FIG. 2 is a plan view of the connecting member 3 whose body is not deformed. FIG. 3 is an enlarged view of region A in FIG. 2. FIG. 4 is an enlarged view of region B in FIG. 2. FIG. 5 is a plan view of the connecting member 3 whose body 30 is deformed.

As illustrated in FIG. 1, the display panel 2 of the display 100 is held by the backlight 10 and the front frame 1, and is fastened to the middle frame 4 of the backlight 10 with the connecting member 3. The connecting member 3 may be attached to a polarization plate (not shown) on the display panel 2 side, or may be attached to a glass substrate. Single-faced cushioning tape can be used as the connecting member 3 in order to reduce load on the display panel 2.

As illustrated in FIG. 1, the connecting member 3 has an opening 3a (c.f., FIG. 5) corresponding to the opening 4a of the middle frame 4, and is provided to cover the periphery of the opening 4a of the middle frame 4. Here, the outline of the opening 4a of the middle frame 4 in plan view is the same as the outline of the opening 3a of the connecting member 3 in plan view. Furthermore, the opening 4a corresponds to a first opening, and the opening 3a corresponds to a second opening.

The following details the connecting member 3. As illustrated in FIG. 2, the connecting member 3 includes the body 30, a slit 31, a pair of cuts 33, and two cuts 32.

The body 30 is a flexible strip. The slit 31 extends in the longer-side direction of the body 30 in the middle portion in the shorter-side direction of the body 30, with both end portions in the longer-side of the body 30 being left. The body 30 is accordingly divided into a first side 30a and a second side 30b facing each other by the slit 31.

The pair of cuts 33 are disposed at both end portions in the longer-side direction of the body 30. The two notches 32 are disposed in respective positions contiguous to the slit 31 on the first and second sides 30a and 30b.

As earlier described, the body 30 is flexible; thus, the first side 30a and the second sides 30b can deform and change their positions. When the first side 30a and the second side 30b are not deformed, and when the positions of the first side 30a and the second side 30b are not changed, a distance L1 from the top of the notch 32 on the first side 30a to one end in the longer-side direction of the body 30 is the same as a distance L2 from the top of the notch 32 on the second side 30b to the other end in the longer-side direction of the body 30.

One of the cuts 33 is formed in such a manner that an angle θ1 between one of the sides of the cut 33 and its centerline, which is the slit 31, is the same as an angle θ2 between the other side and the centerline. Likewise, the other cut 33 is formed in such a manner that an angle θ7 between one of the sides of the cut 33 and its centerline is the same as an angle θ8 between the other side and the centerline. That is, the pair of cuts 33 are each an isosceles triangle.

One of the notches 32 is formed in such a manner that an angle θ3 between one of the sides of the notch 32 and its centerline, which is a line perpendicular to the slit 31, is the same as an angle θ4 between the other side and the centerline. Likewise, the other notch 32 is formed in such a manner that an angle θ5 between one of the sides of the notch 32 and its centerline is the same as an angle θ6 between the other side and the centerline. That is, the two notches 32 are each an isosceles triangle.

As illustrated in FIGS. 3 and 4, a length L3 from the end of the slit 31 to the top of the cut 33 and a length L4 from the end in the shorter-side direction of the body 30 each desirably have a processable minimum size in the formation of the cuts 33 and the notches 32.

With reference to FIG. 5, the following describes the body 30 with the first side 30a and the second side 30b being deformed and with their positions being changed. As illustrated in FIG. 5, the slit 31 is transformed into the opening 3a by deforming the first side 30a and the second side 30b and also changing the positions of the first side 30a and the second side 30b in such a manner that the two sides of equal length of the isosceles triangle of each cut 33 abut, and that the two sides of equal length of the isosceles triangle of each notch 32 abut. The opening 3a is formed in such a manner that the notch 32 on the first side 30a face the notch 32 on the second side 30b, and that the pair of cuts 33 face each other. At this stage, a side having the distance L1 from one of the cuts 33 to one of the notches 32 face a side having the distance L2 from the other cut 33 to the other notch 32. The body 30 is thus a rectangle having the opening 3a, that is, a hollow square.

The angles θ1 to θ8 shown in FIG. 2, when being 45 degrees, enable rectangle formation without producing an overlap between portions in which the two sides of equal length of each isosceles triangle and without producing a gap, in the deformation and position change of the first side 30a and the second side 30b. Further, the angles θ1 to θ8, when being greater than 45 degrees, enables rectangle formation without producing overlaps in the connecting member 3 while maintaining the continuity of the connecting member 3. It is noted that the pair of cuts 33 and the two notches 32, although each being desirably an isosceles triangle, may be any triangle whose sides, when bent, do not overlap each other.

As described above, the slit 31 in the display 100 according to the first preferred embodiment is transformed into the opening 3a by deforming the first side 30a and the second side 30b and also changing the positions of the first side 30a and the second side 30b in such a manner that the two sides of the triangle of each cut 33 abut, and that the two sides of the triangle of each notch 32 abut. In addition, the body 30 in the display 100 continuously extends in its entire periphery. The body 30 consequently has no disconnected portion. Such a configuration prevents foreign-matter entrance from the connecting member 3 when the display panel 2 is fastened the middle frame 4. This configuration also prevents liquid entrance in bonding, such as liquid bonding.

The cuts 33, the notches 32, and the slit 31 are formed onto the strip connecting member 3. Accordingly, the connecting member 3 is shaped into a rectangle with the opening 3a. Such a configuration reduces raw materials when compared to double-faced tape that is shaped into a rectangle that inherently has an opening. This exceptionally saves cost for manufacturing the connecting member 3. This also eliminates complex work of attaching double-faced tape consisting of multiple tape strips when the connecting member 3 is attached.

The opening 3a is formed in such a manner that the notch 32 on the first side 30a face the notch 32 on the second side 30b, and that the pair of cuts 33 face each other. The connecting member 3 is consequently shaped into a rectangle.

The notches 32 are individually disposed on the first side 30a and the second side 30b. When the first side 30a and the second side 30b are not deformed, and when the positions of the first side 30a and the second side 30b are not changed, the distance L1 from the top of the notch 32 on the first side 30a to one end in the longer-side direction of the body 30 is the same as the distance L2 from the top of the notch 32 on the second side 30b to the other end in the longer-side direction of the body 30.

The deformation and position change of the first side 30a and the second side 30b enable two sides facing each other, that is, the side with the distance L1 and the side with the distance L2, to have the same length, and further enable the other two sides facing each other to have the same length. Consequently, the connecting member 3 is shaped into a rectangle covering the periphery of the opening 4a of the middle frame 4.

The notches 32 and the cuts 33 each have an angle greater than 45 degrees. Such an angle enables rectangle formation without overlaps in the connecting member 3 while maintaining the continuity of the connecting member 3.

Second Preferred Embodiment

Figure 6:
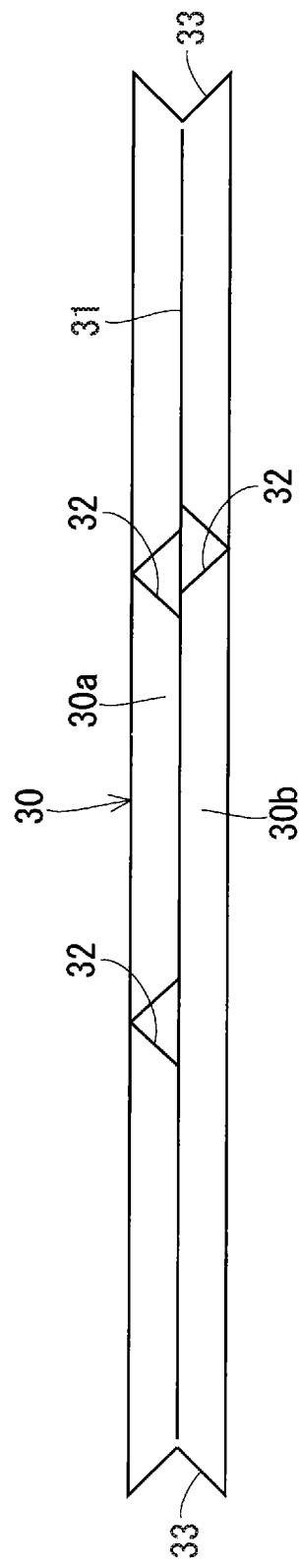
FIG. 6 is a plan view of a connecting member whose body is not deformed, the connecting member being included in a display according to a second preferred embodiment.
Figure 7:
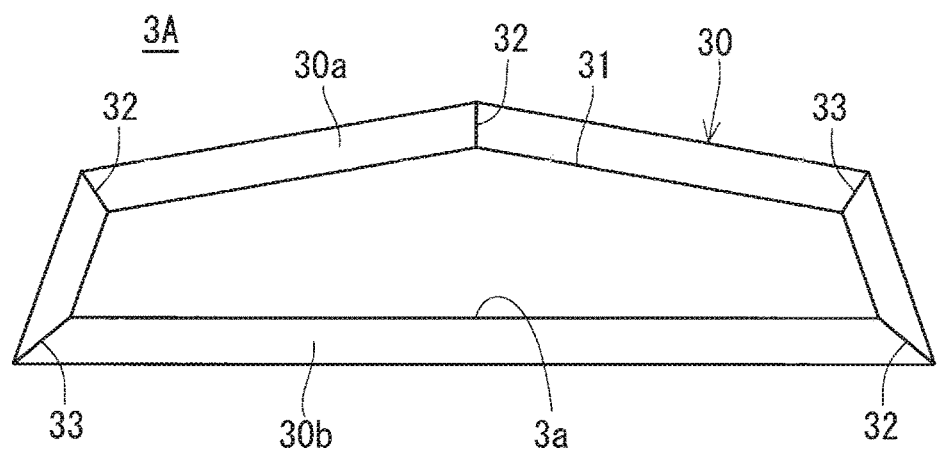
FIG. 7 is a plan view of the connecting member whose body is deformed.

The following describes a connecting member 3A that is included in the display 100 according to a second preferred embodiment. FIG. 6 is a plan view of the connecting member 3A whose body 30 is not deformed, the connecting member 3A being included in the display 100 according to the second preferred embodiment. FIG. 7 is a plan view of the connecting member 3A whose body 30 is deformed. Identical components between the first and second preferred embodiments are denoted by identical signs and will not be elaborated upon.

As illustrated in FIG. 6, the connecting member 3A in the second preferred embodiment includes the body 30, the slit 31, the pair of cuts 33, and three notches 32. Number increase in the notch 32 from two to three enables shaping of the body 30 into a pentagon having the opening 3a as illustrated in FIG. 7. Although a polygon can be formed in accordance with the number of notches 32, the interior angles of the polygon depend on an angle at which the slit 31 is deformable from its strip shape.

As described above, the display 100 according to the second preferred embodiment includes the connecting member 3A shaped into a pentagon having the opening 3a. Such a configuration, like the corresponding configuration in the first preferred embodiment, prevents foreign-matter entrance from the connecting member 3A when the display panel 2 is fastened to the middle frame 4. This configuration also prevents liquid entrance in bonding, such as liquid bonding.

Third Preferred Embodiment

Figure 8:
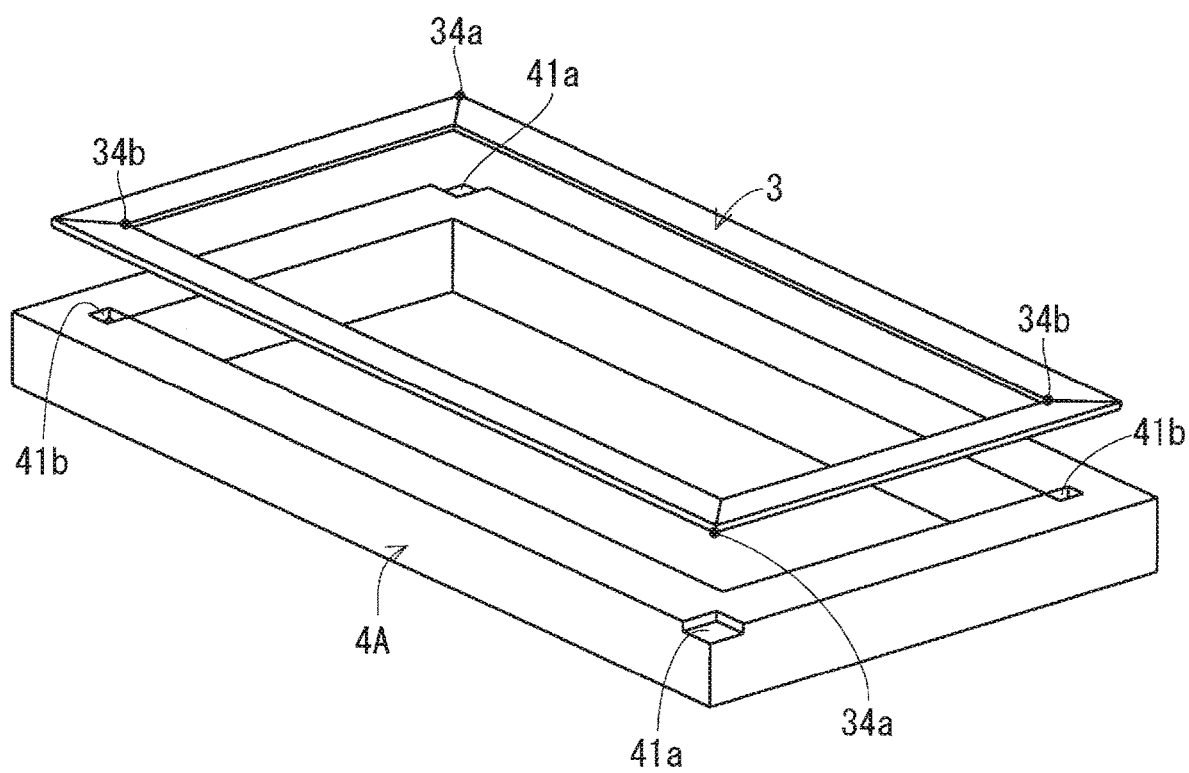
FIG. 8 is an exploded perspective view of a connecting member and a middle frame that are included in a display according to a third preferred embodiment.
Figure 9:
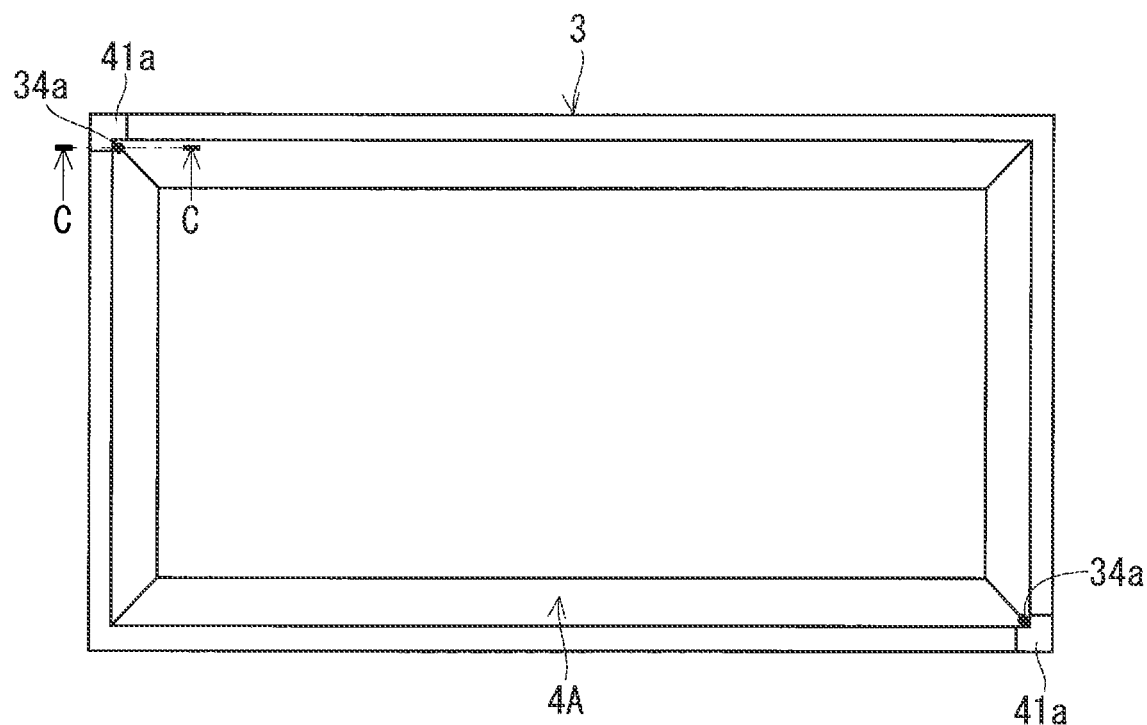
FIG. 9 is a plan view of the connecting member and the middle frame.
Figure 10:
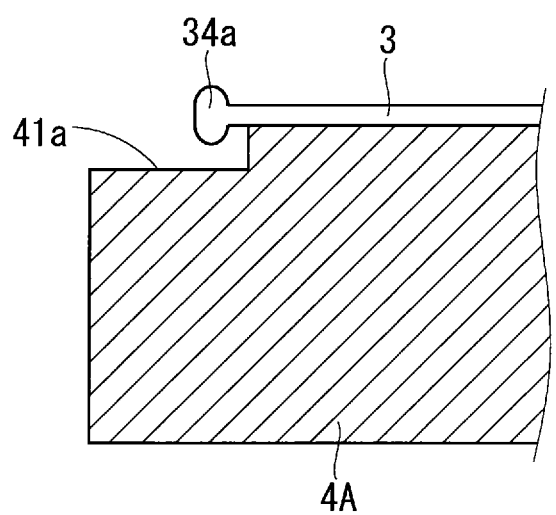
FIG. 10 is a cross sectional view taken along line C-C in FIG. 9.

The following describes the connecting member 3 and a middle frame 4A that are included in the display 100 according to a third preferred embodiment. FIG. 8 is an exploded perspective view of the connecting member 3 and the middle frame 4A, included in the display 100 according to the third preferred embodiment. FIG. 9 is a plan view of the connecting member 3 and the middle frame 4A. FIG. 10 is a cross sectional view taken along line C-C in FIG. 9. Identical components between the third preferred embodiment and the first and second preferred embodiments are denoted by identical signs and will not be elaborated upon.

As illustrated in FIG. 8, the display 100 in the third preferred embodiment includes the middle frame 4A instead of the middle frame 4.

As earlier described with reference to FIG. 2, for the angles θ1 to θ8 being equal to or greater than 45 degrees, portions in which the two sides of equal length of individual isosceles triangles abut, do not overlap each other in the deformation and position change of the first side 30a and the second side 30b. As illustrated in FIGS. 8 to 10, abutting the two equal sides of the isosceles triangle of each cut 33 and abutting the two equal sides of the isosceles triangle of each notch 32 practically form minute steps 34a and 34b. The step 34a is disposed on the top of each notch 32, and the step 34b is disposed on the top of each cut 33. That is, the steps 34a are disposed in the outer periphery of the body 30, and the steps 34b are disposed in the inner periphery of the body 30.

The middle frame 4A includes recesses 41a and 41b disposed in positions corresponding to the steps 34a and 34b. The recesses 41a are disposed in the outer periphery of the upper end portion of the middle frame 4A, and have a size enough to accommodate the steps 34a. The recesses 41b are disposed in the inner periphery of the upper end of the middle frame 4A, and have a size enough to accommodate the steps 34b. As such, the steps 34a and 34b are respectively accommodated in the recesses 41a and 41b when the connecting member 3 is attached to the middle frame 4A.

As described above, the display 100 according to the third preferred embodiment includes the middle frame 4A having the recesses 41a and 41b disposed in the positions corresponding to the steps 34a and 34b that are formed by abutting the two sides of the triangle of each cut 33 and also abutting the two sides of the triangle of each notch 32. Thus, the steps 34a and 34b are respectively accommodated in the recesses 41a and 41b when the connecting member 3 is attached to the middle frame 4A. This reduces load locally applied to the display panel 2 when the display panel 2 is fastened to the middle frame 4A.

OTHER MODIFICATIONS

The display 100 may include a touch panel instead of the display panel 2. The connecting member 3 may be disposed between the touch panel and the middle frame 4 or the middle frame 4A. The connecting member 3A may be disposed between the touch panel and the middle frame 4.

The connecting members 3 and 3A are usable in every member to which double-faced tape having a hollow-square shape is attached, other than the middle frames 4 and 4A.

Further, the connecting members 3 and 3A each may be disposed between three or more members.

It is noted that in the present invention, the individual preferred embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A connecting member disposed between at least two members, the connecting member comprising:
   a body that is a flexible strip;
   a slit extending in a longer-side direction of the body in a middle portion in a shorter-side direction of the body, with both end portions in the longer-side of the body being left, the slit dividing the body into a first side and a second side facing each other;
   a pair of cuts disposed at both end portions in the longer-side direction of the body, the pair of cuts each being a triangle; and
   notches disposed in respective positions contiguous to the slit on the first and second sides, the notches each being a triangle,
   wherein the slit is transformed into an opening by deforming the first and second sides and also changing positions of the first and second sides in such a manner that two sides of the triangle of each of the pair of cuts abut, and that two sides of the triangle of each of the notches abut, and
   the body continuously extends in its entire periphery.

2. A display comprising:
   a display panel or a touch panel configured to display an image;
   a backlight comprising a frame provided with a first opening; and
   a connecting member disposed between the display panel or the touch panel and the frame,
   wherein the connecting member comprises
   a body that is a flexible strip,
   a slit extending in a longer-side direction of the body in a middle portion in a shorter-side direction of the body, with both end portions in the longer-side of the body being left, the slit dividing the body into a first side and a second side facing each other,
   a pair of cuts disposed at both end portions in the longer-side direction of the body, the pair of cuts each being a triangle, and
   notches disposed in respective positions contiguous to the slit on the first and second sides, the notches each being a triangle,
   the slit is transformed into a second opening by deforming the first and second sides and also changing positions of the first and second sides in such a manner that two sides of the triangle of each of the pair of cuts abut, and that two sides of the triangle of each of the notches abut, the second opening corresponding to the first opening, and
   the body continuously extends in its entire periphery.

3. The display according to claim 2, wherein
   the notches are individually disposed on the first side and the second side, and
   when the first and second sides are not deformed, and when the positions of the first and second sides are not changed, a distance from a top of the notch on the first side to one of the ends in the longer-side direction of the body is the same as a distance from a top of the notch on the second side to the other end in the longer-side direction of the body.

4. The display according to claim 3, wherein the notches and the pair of cuts each have an angle greater than 45 degrees.

5. The display according to claim 2, wherein two or more of the notches are disposed on the first side or the second side.

6. The display according to claim 2, wherein the second opening is formed in such a manner that the notch on the first side face the notch on the second side, and that the pair of cuts face each other.

7. The display according to claim 2, wherein the frame comprises a recess disposed in a position corresponding to a step formed by abutting the two sides of the triangle of each of the pair of cuts and also abutting the two sides of the triangle of each of the notches.

* * * * *